Patented June 15, 1954

2,681,280

UNITED STATES PATENT OFFICE 2,681,280

FERMENTATION OF EGGS

Joseph E. Sherman and Lloyd B. Jensen, Chicago, Ill., assignors to Swift & Company, Chicago, Ill., a corporation of Illinois No Drawing. Application August 10, 1951, Serial No. 241,384

4 Claims. (Cl. 99—113)

The present invention relates in general to the fermentation of eggs, and more particularly to a method for the treatment of whole eggs in the shell to condition such eggs for subsequent fermentation.

Dried egg products are now produced on a large scale commercially and have proven highly successful due to the ease of shipment and storage thereof. It has heretofore been recognized that the whipping and keeping properties of both dried whole eggs and dried egg whites are greatly improved by a fermentation treatment of the egg material before drying. In general, the fermentation processes of the prior art have been restricted to the treatment of egg whites alone, since whole egg mixtures when held for the length of time required for fermentation tend to spoil readily. In all cases, the general procedure has been to break the eggs out of their shells, and then to add either to the whites alone, or in some instances to a mixture of the liquid whites and yolks, a culture of fermenting microorganisms. The inoculated mixture has then been held at an incubating temperature around 100° F. for a sufficient period of time to substantially deplete the sugar content of the eggs, and the resultant product dried by discharge into a drying chamber in the form of a spray or by other suitable means. Rapidity of fermentation is the aim of all successful processes of dried egg production, since upon this factor depends the desirable whipping characteristics of the product. Inhibiting agents present in the egg, as for example lysozyme, tend to retard fermentation and to require longer periods of incubation in order to secure the desired reduction in sugar content.

It is, therefore, an object of the present invention to provide a method for conditioning shell eggs prior to actual fermentation.

An additional object is to provide a method for decreasing the actual time required for fermentation of whole eggs or of egg whites.

A further object of the invention is to provide a method for overcoming the inhibitory action on fermentation of agents, such as lysozyme or the like, which are normally present in eggs.

Additional objects if not specifically set forth herein will be readily apparent to one skilled in the art from the following detailed description of the invention:

Generally, the present invention comprises inoculating unbroken whole eggs in the shell with particulate microorganisms whereby the eggs are so conditioned that, upon subsequent breaking out and incubation of the inoculated egg material, fermentation of the egg whites, or egg whites and yolks, proceeds at a very rapid rate.

More specifically, the present invention contemplates the treatment of whole eggs, while still in the shell, by a fluid medium containing fermenting microorganisms under such conditions that the maximum number of such microorganisms are permitted to pass through the shells of the eggs and into the egg magma. These microorganisms, by their introduction or inoculation into the egg before the shell is broken, become acclimatized or habituated to the egg magma and its inhibiting agents such as lysozyme. The eggs, treated in accordance with this invention, should be held for at least 24 hours at a temperature of about 70° F. to 100° F. immediately before breaking in order to permit the acclimatizing process to take place within the eggs. The eggs may be then broken in the conventional manner and the whites separated out if desired.

The liquid egg material, either the whites alone or mixtures of the whites and yolks, are then placed under incubating conditions, as more fully described below, until substantially complete fermentation has taken place. It has been found that a sufficiently heavy inoculation of fermenting microorganisms normally takes place in the condition treatment to effect a rapid and satisfactory fermentation of the egg material after it is broken out and incubated. However, it is considered within the scope of the present invention to supplement the conditioning inoculation by the use of additional cultures of bacterial agents added to the broken-out egg material if desired.

While it is considered within the scope of the present invention to use any of the known fermenting cultures in the conditioning inoculation of the shell eggs, it has been found that the following cultures produce good results: Lactobacilli, yeast (Sacc. cerevisae), and *Aerobacter aerogenes*. Some cultures will not produce optimum results, although operative to an extent, as for example *Lactobacillus bulgaricus*.

The conditioning inoculation is carried out by treatment of the shell eggs in a fluid medium containing the desired fermenting microorganisms. Either a culture broth or inoculated water may be used. Unlike oils or gases, these microorganisms will not penetrate the egg shells except under specific conditions. It is necessary to create a differential pressure in the egg whereby, in effect, the microorganisms pass into the egg under the influence of suction. This is done by maintaining a relative difference in temperature between the egg and the fluid medium of about 50°–105° F.

In the preferred method, the shell eggs are thoroughly heated to a uniform temperature throughout of from about 90° to 105° F. They are then immersed in the culture broth or inoculated water which is maintained at a temperature of about 50° to 65° F. lower than the eggs, for example about 40° F. Under these conditions the fermenting microorganisms are permitted to pass through the shells of the eggs and into the egg magma. A period of submersion or contact of the shells with the fluid, culture-containing medium of about 3 to 5 minutes is required for maximum penetration by the culture. After inoculation, the eggs may be placed in cold storage if desired for periods up to 8 months before breaking out the contents. It is desirable to use these inoculated eggs within 6 months from inoculation for consistently good results. However, whether the inoculated eggs are to be broken out immediately, or are to be stored in cold storage for a considerable period of time before breaking, the inoculated eggs should be maintained for about the last 24 hours immediately before breaking at a temperature within the range of about 70°–100° F.

During this acclimatizing period, the fermentative microorganisms inoculated through the shell begin to multiply very slowly within the albumin of the eggs. The 24 hour period has been found sufficient to permit the acclimatizing process to take place to a sufficient extent to produce rapid fermentation upon breaking out of the egg material. Since the microorganisms multiply very slowly within the unbroken egg, acclimatizing periods in excess of 24 hours may be used, but because it is usually desirable to process the eggs as rapidly as possible it would only be under unusual circumstances that a period of much in excess of 24 hours would be used.

At the end of the acclimatizing period, the inoculated eggs are broken out and vat-fermented, either as whites or as whole magma including yolks, in the conventional manner. The fermentation is stopped by lowering the temperature of the vat of fermented eggs to 40°–45° F. when the egg whites, for example, reach an acidity of pH 6.0. The time will vary from 3 to 18 hours for fermentation, depending on the particular microorganisms used. Conventional temperatures of about 90° F. to 105° F. are used in the fermentation of the eggs treated by the present method.

The term "fermenting microorganisms" as used in the appended claims is intended to cover any of the known bacterial cultures heretofore used in egg fermentation.

Obviously, many modifications and variations of the invention hereinbefore set forth may be made without departing from the spirit and scope thereof, and therefore only such limitations should be imposed as are indicated in the appended claims.

We claim:

1. The method of treating raw shell eggs to improve their whipping and keeping properties when subsequently dried which comprises: immersing unbroken shell eggs in a liquid medium containing fermenting microorganisms, said liquid medium being maintained at a substantially lower temperature than said eggs whereby penetration of said eggs by a substantial number of said microorganisms takes place; removing said eggs from said liquid medium; holding said treated eggs in the unbroken state for at least 24 hours after removal from said liquid medium at an acclimatizing temperature; and thereafter breaking the shells of said eggs and subjecting the contents thereof to incubating temperatures until the fermentation of said contents is substantially complete.

2. The method of treating raw shell eggs which comprises: contacting unbroken shell eggs with a liquid medium containing fermenting microorganisms selected from the group consisting of Lactobacilli, *Aerobacter aerogenes*, *Lactobacillus bulgaricus*, and *Saccharomyces cerevisae*, said liquid medium being maintained at a temperature from 50° to 65° F. lower than the temperature of said eggs, whereby said eggs are inoculated with said fermenting microorganisms; holding said treated eggs in the unbroken state for at least 24 hours after removal from said liquid medium at an acclimatizing temperature; thereafter breaking out the inoculated contents of said eggs from said shells; and subjecting said contents to incubating temperatures until fermentation is substantially complete.

3. The method of treating raw shell eggs which comprises: heating unbroken shell eggs to a temperature of about 90° to 105° F.; immersing said heated eggs in a liquid medium containing fermenting microorganisms selected from the group consisting of Lactobacilli, *Aerobacter aerogenes*, *Lactobacillus bulgaricus*, and *Saccharomyces cerevisae*, said liquid medium being maintained at a temperature of about 40° F.; removing said eggs from said liquid medium; holding said treated eggs in the unbroken state for at least 24 hours after removal from said liquid medium at a temperature of about 70° F. to about 100° F.; breaking the shells of said eggs; and subjecting the contents of said broken eggs to incubating temperatures until fermentation is substantially complete.

4. The method of treating raw shell eggs which comprises: heating unbroken shell eggs to a temperature of about 90° to 105° F.; immersing said heated eggs in a liquid medium maintained at about 40° F., said liquid medium containing fermenting microorganisms selected from the group consisting of Lactobacilli, *Aerobacter aerogenes*, *Lactobacillus bulgaricus*, and *Saccharomyces cerevisae*; maintaining said eggs in said medium for at least about 3 minutes to permit penetration of the shells of said eggs by the microorganisms in said liquid medium; removing said eggs from said liquid medium; holding said treated eggs in the unbroken state for at least 24 hours after removal from said liquid medium at a temperature of about 70° F. to about 100° F.; breaking the shells of said eggs; and subjecting the contents of said broken eggs to incubating temperatures until fermentation is substantially complete.

References Cited in the file of this patent

UNITED STATES PATENTS

| Number | Name | Date |
| --- | --- | --- |
| 2,460,986 | Josh et al. | Feb. 8, 1949 |
| 2,476,412 | Harris | July 19, 1949 |
| 2,497,817 | Hale et al. | Feb. 14, 1950 |
| 2,568,917 | Gray | Sept. 25, 1951 |
| 2,585,015 | Kaplan et al. | Feb. 15, 1952 |

OTHER REFERENCES

"Experimental Cookery," second edition, 1937, by B. Lowe, published by John Wiley & Sons, Inc., New York, page 330.

"Bacterial Chemistry & Physiology," 1946 by J. G. Porter, published by John Wiley & Sons, Inc., New York, pages 181 and 182.